US010931570B1

(12) United States Patent
Kwon et al.

(10) Patent No.: US 10,931,570 B1
(45) Date of Patent: Feb. 23, 2021

(54) FLOODING TO ROUTING

(71) Applicant: Rockwell Collins, Inc., Cedar Rapids, IA (US)

(72) Inventors: Tj T. Kwon, Marion, IA (US); Justin W. Ehm, Cedar Rapids, IA (US); Anthony D. Schaefer, Marion, IA (US); Wayne H. Meyer, Cedar Rapids, IA (US); Joseph T. Graf, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 11 days.

(21) Appl. No.: 16/537,824

(22) Filed: Aug. 12, 2019

(51) Int. Cl.
*H04L 12/721* (2013.01)
*H04L 12/801* (2013.01)
*H04L 12/911* (2013.01)
*H04L 12/707* (2013.01)
*H04L 12/751* (2013.01)
*H04L 12/26* (2006.01)

(52) U.S. Cl.
CPC .............. *H04L 45/32* (2013.01); *H04L 43/16* (2013.01); *H04L 45/02* (2013.01); *H04L 45/22* (2013.01); *H04L 45/26* (2013.01); *H04L 47/12* (2013.01); *H04L 47/746* (2013.01)

(58) Field of Classification Search
CPC ....... H04L 45/32; H04L 47/12; H04L 47/746; H04L 45/22; H04L 45/02; H04L 45/26; H04L 43/16; H04L 45/00; H04L 45/10; H04L 49/25; H04W 40/00; H04W 40/02
USPC ........................................................ 370/351
See application file for complete search history.

(56) References Cited

U.S. PATENT DOCUMENTS

| 5,835,482 | A | 11/1998 | Allen |
| 8,223,660 | B2 | 7/2012 | Allan et al. |
| 9,246,795 | B2 | 1/2016 | Madaiah et al. |
| 2008/0107034 | A1* | 5/2008 | Jetcheva ................. H04L 45/26 370/238 |

(Continued)

OTHER PUBLICATIONS

U.S. Appl. No. 16/367,483, filed Mar. 28, 2019, Kwon et al.
U.S. Appl. No. 16/369,398, filed Mar. 29, 2019, Kwon et al.

*Primary Examiner* — Robert J Lopata
(74) *Attorney, Agent, or Firm* — Suiter Swantz pc llo

(57) ABSTRACT

In embodiments, a communication node of a multi-node communication network includes a communication interface and a controller communicatively coupled to the communication interface. In embodiments, the controller is configured to receive a first data packet transmitted from a source communication node to a destination communication node; transmit the first data packet via a packet flooding procedure; receive a first route response transmitted from the destination communication node along a discovered route; relay an additional data packet transmitted from the source communication node to the destination communication node along the discovered route; determine a route failure of the additional data packet; re-transmit the additional data packet to the destination communication node via a packet flooding procedure; receive an additional route response transmitted from the destination communication node along a recovered route; and relay a second additional data packet transmitted from the source communication node along the recovered route.

15 Claims, 11 Drawing Sheets

(56) References Cited

U.S. PATENT DOCUMENTS

| | | | | |
|---|---|---|---|---|
| 2010/0074101 | A1* | 3/2010 | Skalecki | H04L 45/02 |
| | | | | 370/221 |
| 2013/0250808 | A1* | 9/2013 | Hui | H04W 40/28 |
| | | | | 370/255 |
| 2015/0222479 | A1* | 8/2015 | Kim | H04W 28/0236 |
| | | | | 370/218 |
| 2016/0373997 | A1* | 12/2016 | Petersen | H04W 72/0406 |
| 2017/0111266 | A1* | 4/2017 | Ko | H04W 40/26 |
| 2017/0134227 | A1* | 5/2017 | Song | H04L 1/1887 |
| 2017/0149658 | A1* | 5/2017 | Rimhagen | H04L 45/32 |
| 2018/0013665 | A1* | 1/2018 | Ko | H04L 45/32 |
| 2018/0302807 | A1* | 10/2018 | Chen | H04W 28/0268 |
| 2020/0052997 | A1* | 2/2020 | Ramanathan | H04L 45/20 |

\* cited by examiner

FLOODING TO ROUTING

BACKGROUND

Mobile ad-hoc networks (MANETs) are known in the art as quickly deployable, self-configuring wireless networks with no pre-defined network topology. Each communication node within a MANET is presumed to be able to move freely. Additionally, each communication node within a MANET may be required to forward (relay) data packet traffic. Data packet routing and delivery within a MANET may depend on a number of factors including, but not limited to, the number of communication nodes within the network, communication node proximity and mobility, power requirements, network bandwidth, user traffic requirements, timing requirements, and the like.

Currently, packet flooding is one of the only techniques which may be used to deliver a data packet to a particular destination without knowing the route or network topology. Packet flooding typically involves transmitting short "route-request" packets and/or "topology control (advertisement)" messages throughout the network in order to discover network topology and/or advertise local link status throughout the network. The link status is discovered by exchanging "Hello" messages. However, route request packets and "hello" messages are typically much shorter than data packets whose discovered route or link will be used in subsequent data transmissions. Accordingly, routes discovered using shorter route request packets and "hello" messages may not be ideal for subsequent data packet transmissions due to increased packet error rates.

Moreover, due to changing environmental conditions and mobile communication nodes within a MANET, channel quality, channel congestion, and network topology may constantly change within a MANET, causing discovered routes to quickly become stale or otherwise ill-suited for data transmission. Stale and/or failed routes require additional route discovery and/or route recovery time, which may not be tolerated in some implementations of the MANET.

Therefore, it would be desirable to provide a system and method which cure one or more of the shortfalls of the previous approaches identified above.

SUMMARY

A communication node of a multi-node communication network is disclosed. In embodiments, the communication node includes a communication interface and a controller communicatively coupled to the communication interface. In embodiments, the controller is configured to receive a first data packet transmitted from a source communication node to a destination communication node; transmit the first data packet to one or more relay communication nodes via a packet flooding procedure; receive a first route response transmitted from the destination communication node to the source communication node along a discovered route; relay a first additional data packet transmitted from the source communication node to the destination communication node along the discovered route; determine a route failure of the first additional data packet; re-transmit the first additional data packet to the destination communication node via a packet flooding procedure; receive an additional route response transmitted from the destination communication node to the source communication node along a recovered route; and relay a second additional data packet transmitted from the source communication node to the destination communication node along the recovered route.

A method for transmitting data within a multi-node communication network is disclosed. In embodiments, the method includes: transmitting a first data packet from a source communication node of a multi-node communication network to a destination communication node via a flooding transmission procedure; receiving the first data packet transmitted along a discovered route including one or more relay communication nodes with the destination communication node; transmitting a route response from the destination communication node to the source communication node along the discovered route; transmitting a first additional data packet from the source communication node to the destination communication node along the discovered route; determining, with a relay communication node of the one or more relay communication nodes along the discovered route, a route failure of the first additional data packet; re-transmitting, with the relay communication node of the one or more relay communication nodes, the first additional data packet to the destination communication node via a packet flooding procedure; receiving an additional route response acknowledgment transmitted from the destination communication node to the source communication node along a recovered route; and relaying a second additional data packet from the source communication node to the destination communication node along the recovered route with the relay communication node of the one or more relay communication nodes.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
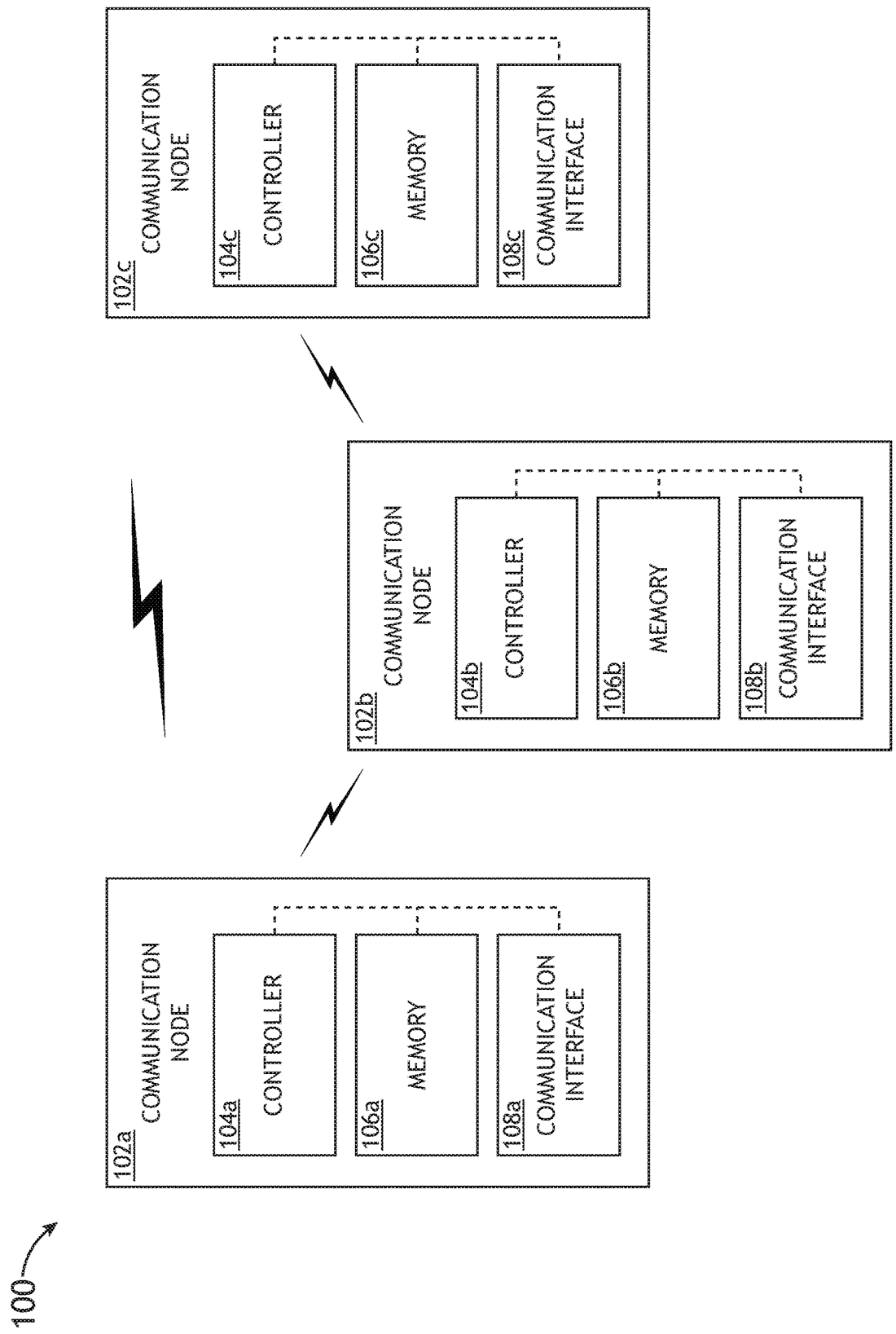
FIG. 1 illustrates a multi-node communication network, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Mobile ad-hoc networks (MANETs) are known in the art as quickly deployable, self-configuring wireless networks with no pre-defined network topology. Each communication node within a MANET is presumed to be able to move freely. Additionally, each communication node within a MANET may be required to forward (relay) data packet traffic. Data packet routing and delivery within a MANET may depend on a number of factors including, but not limited to, the number of communication nodes within the network, communication node proximity and mobility, power requirements, network bandwidth, user traffic requirements, timing requirements, and the like.

Currently, packet flooding is one of the only techniques which may be used to deliver a data packet to a particular destination without knowing the route or network topology. Packet flooding typically involves transmitting short "route-request" packets and/or "topology control (advertisement)" messages throughout the network in order to discover network topology and/or advertise local link status throughout the network. The link status is discovered by exchanging "Hello" messages. However, route request packets and "hello" messages are typically much shorter than data packets whose discovered route or link will be used in subsequent data transmissions. Accordingly, routes discovered using shorter route request packets and "hello" messages may not be ideal for subsequent data packet transmissions due to increased packet error rates.

Moreover, due to changing environmental conditions and mobile communication nodes within a MANET, channel quality, channel congestion, and network topology may constantly change within a MANET, causing discovered routes to quickly become stale or otherwise ill-suited for data transmission. Stale and/or failed routes require additional route discovery and/or route recovery time, which may not be tolerated in some implementations of the MANET.

Accordingly, embodiments of the present disclosure are directed to a system and method which cure one or more of the shortfalls of the previous approaches identified above. Embodiments of the present disclosure are directed to a system and method of transmitting data packets through a multi-node communication network via packet flooding procedures and discovered routes. In particular, embodiments of the present disclosure are directed to transmitting data packets via a "flooding-to-routing" communication technique. Additional embodiments of the present disclosure are directed to a system and method for identifying routes within a multi-node communication network without the use of route request packets or "hello" messages. Further embodiments of the present disclosure are directed to a system and method utilizing packet flooding procedures to recover routes within a multi-node communication network.

It is contemplated herein that transmitting data packets of a data transmission, in lieu of route-request packets or "hello" messages, may ensure discovered routes are suitable and/or appropriate for the data transmission and may reduce a route failure rate within the multi-node communication network. Moreover, the transmission of data packets in lieu of route request packets may enable more efficient network topology learning. It is further contemplated herein that the system and method of the present disclosure may reduce the time required for initial route discovery as well as route recovery, enabling faster and more efficient communication within a multi-node communication network.

FIG. 1 illustrates a multi-node communication network 100, in accordance with one or more embodiments of the present disclosure. In embodiments, the multi-node communication network 100 may include a plurality of communication nodes 102. For example, the multi-node communication network 100 may include a first communication node 102a, a second communication node 102b, and a third communication node 102c.

The multi-node communication network 100 may include any multi-node communication network known in the art. For example, the multi-node communication network 100 may include a mobile ad-hoc network (MANET) in which each communication node 102 within the multi-node communication network is able to move freely and independently. Similarly, the one or more communication nodes 102 may include any communication node known in the art which may be communicatively coupled. In this regard, the one or more communication nodes 102 may include any communication node known in the art for transmitting/transceiving data packets. For example, the one or more communication nodes 102 may include, but are not limited to, radios, mobile phones, smart phones, tablets, smart watches, laptops, and the like.

Each communication node 102 of the one or more communication nodes 102a, 102b, 102c may include, but is not limited to, a respective controller 104 (e.g., controller 104a, 104b, 104c, etc.), memory 106 (e.g., memory 106a, 106b, 106c, etc.), and communication interface 108 (e.g., communication interface 108a, 108b, 108c, etc.).

The controller 104 provides processing functionality for at least the communication node 102 and can include any number of processors, micro-controllers, circuitry, field programmable gate array (FPGA) or other processing systems, and resident or external memory for storing data, executable code, and other information accessed or generated by the communication node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communication node 102/controller 104, such as software programs and/or code segments, or other data to instruct the controller 104, and possibly other components of the communication node 102, to perform the functionality described herein. Thus, the memory 106 can store data, such as a program of instructions for operating the communication node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of the communication node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communication node 102 and the controller 104. It should be noted that while the communication interface 108 is described as a component of the communication node 102, one or more components of the communication interface 108 can be implemented as external components communicatively coupled to the communication node 102 via a wired and/or wireless connection. The communication node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of a communication node 102 may be configured to communicatively couple to additional communication interfaces 108 of additional communication nodes 102 of the multi-node communication network 100 using any wireless communication techniques known in the art including, but not limited to, GSM, GPRS, CDMA, EV-DO, EDGE, WiMAX, 3G, 4G, 4G LTE, 5G, WiFi protocols, radio frequency (RF), LoRa, and the like.

In embodiments, the controller 104 of a communication node 102 is configured to carry out various steps and functions of the present disclosure. The controller 104 may be configured to: receive a first data packet, via the communication interface 108, transmitted from a source communication node to a destination communication node; transmit the first data packet, via the communication interface 108, to one or more relay nodes via a packet flooding procedure; receive a first route response acknowledgment, via the communication interface 108, transmitted from the destination communication node to the source communication node along a discovered route; relay an additional data packet transmitted from the source communication node to the destination communication node along the discovered route; determine a route failure of the transmitted additional data packet; re-transmit, via the communication interface 108, the additional data packet to one or more relay communication nodes of the multi-node communication network 100 via a packet flooding procedure; receive an additional route response acknowledgment, via the communication interface 108, transmitted from the destination communication node to the source communication node along a recovered route; and transmit the additional data packet, via the communication interface 108, to the destination communication node along the recovered route.

Figure 2:
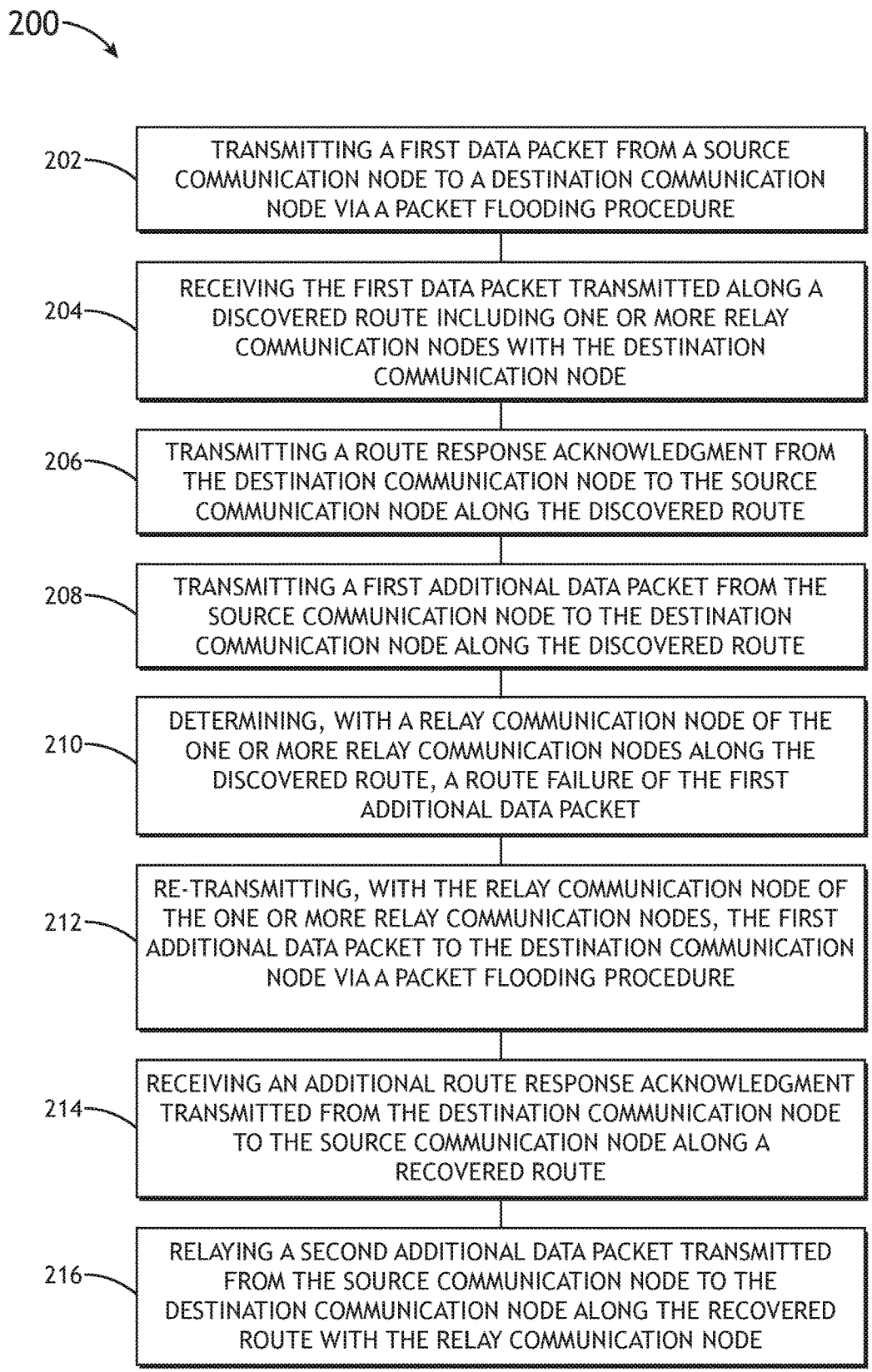
FIG. 2 illustrates a flowchart of a method for transmitting data within a multi-node communication network, in accordance with one or more embodiments of the present disclosure.

Each of these steps carried out by the controller 104 of a communication node 102 of the multi-node communication network 100 may be further shown and understood with reference to FIG. 2.

FIG. 2 illustrates a flowchart of a method 200 for transmitting data within a multi-node communication network 100, in accordance with one or more embodiments of the present disclosure. In particular, FIG. 2 illustrates a method 200 for transmitting data packets within a multi-node communication network 100 with "flooding-to-routing" communication techniques. It is noted herein that the steps of method 200 may be implemented all or in part by multi-node communication network 100. It is further recognized, however, that the method 200 is not limited to the multi-node communication network 100 in that additional or alternative system-level embodiments may carry out all or part of the steps of method 200.

In a step 202, a first data packet (e.g., Data Packet #1) is transmitted from a source communication node 102a of a multi-node communication network 100 to a destination communication node 102n via a packet flooding procedure. This may be further understood with reference to FIG. 3A.

Figure 3A:
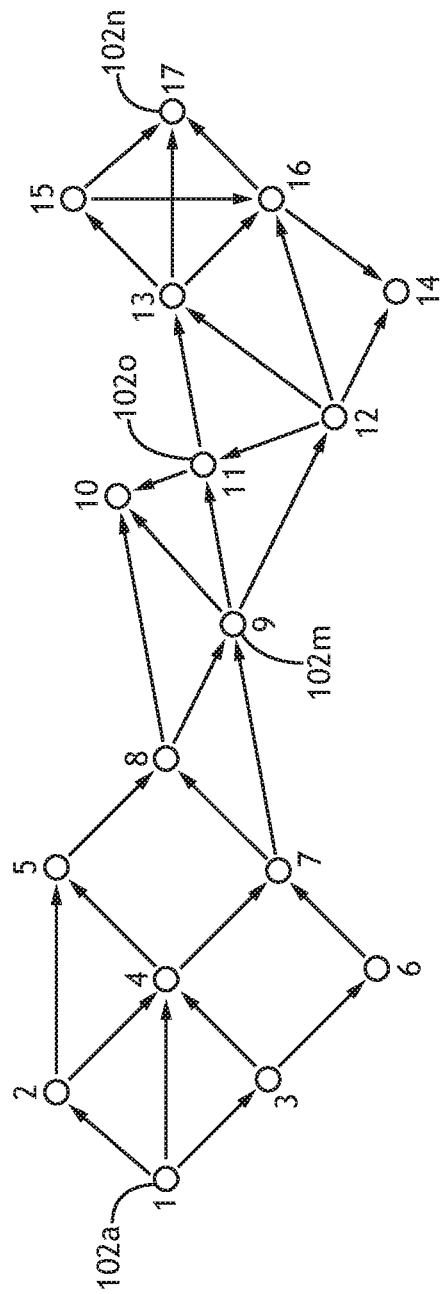
FIG. 3A illustrates a data packet transmitted through a multi-node communication network via a packet flooding procedure, in accordance with one or more embodiments of the present disclosure.

FIG. 3A illustrates a data packet transmitted through a multi-node communication network 100 via a packet flooding procedure, in accordance with one or more embodiments of the present disclosure. In particular, FIG. 3A illustrates a data packet (e.g., Data Packet #1) transmitted from a source communication node 102a of a multi-node communication network 100 to a destination communication node 102n via a packet flooding procedure.

In embodiments, the data packet (e.g., Data Packet #1) is transmitted through the multi-node communication network 100 via a packet flooding procedure, in which each communication node 102 is configured to receive the data packet and relay the data packet to other communication nodes 102 within the multi-node communication network 100. In this regard, relay communication nodes 102 may be configured to receive a data packet and relay (e.g., transmit) the data packet to one or more communication nodes 102 within the multi-node communication network 100 via a packet flooding procedure. For the purposes of the present disclosure, the term "relay communication node 102" may be used to refer to one or more communication nodes 102 between the source communication node 102a and the destination communication node 102n.

In embodiments, the data packet may include a source address and/or a destination address within the header of the data packet in order to facilitate anycasting (e.g., unicasting/multicasting) for purposes of flooding. For example, the data packet may include a source address indicating the data packet originates from the source communication node 102a, and a destination address (e.g., unicasting/multicasting address) indicating the data packet is intended to be delivered to the destination communication node 102n. It is contemplated herein that source/destination addresses may include any unique identifier configured to identify a communication node 102 of the multi-node communication network including, but not limited to, MAC address, IP address, a single byte address, and the like. It is noted herein that transmitting the data packet via a packet flooding procedure may enable the data packet (e.g., Data Packet #1) to be transmitted without any data regarding the topology of the multi-node communication network 100 and intermediate relay communication nodes 102.

In embodiments, each communication node 102 of the multi-node communication network 100 is configured to implement data packet bookkeeping in order to facilitate packet flooding. For example, each communication node 102 may be configured to add a unique identifier (e.g., MAC address, IP address, and the like) to the header of the data packet upon relaying the data packet in order to indicate the data packet was transmitted through the respective communication node 102. In this regard, data packets arriving at the destination communication node 102n may include identifying data in the header of the data packet indicating the number of communication nodes 102 each respective data packet was transmitted through from the source communication node 102a to the destination communication node 102n (e.g., a "hop count"). In embodiments, the controller 104 of each communication node 102 is configured to identify a time-stamp of each received and/or transmitted data packet, and store the time-stamps in memory 106.

It is further noted that data packets may be transmitted through the multi-node communication network 100 using any efficient packet flooding procedure known in the art. For example, data packets may be transmitted through the multi-node communication network 100 utilizing efficient flooding with passive clustering (EFPC). By way of another example, data packets may be transmitted via zero-overhead efficient flooding (ZOEF). ZOEF is described in further detail in U.S. patent application Ser. No. 16/369,398, filed Mar. 29, 2019, entitled ZERO-OVERHEAD EFFICIENT FLOODING, which is incorporated herein by reference in the entirety.

In embodiments, the Data Packet #1 transmitted through the multi-node communication network 100 may include a data packet of a larger data transmission to be transmitted from the source communication node 102a to the destination communication node 102n. In other words, a data packet transmitted via a packet flooding procedure (e.g., Data Packet #1) may include a fragmented internet protocol (IP) payload of a larger data transmission. In embodiments, a data transmission between the source communication node 102a to the destination communication node 102n may be broken up into data packets of equal (or substantially equal) size, such that a first data packet (e.g., Data Packet #1) is equal, or substantially equal, in size to subsequently transmitted data packets.

Accordingly, instead of utilizing traditional route-request packets and/or "hello" messages, the multi-node communication network 100 may utilize data packets of a larger data transmission in order to perform route discovery. In this regard, data packets of a data transmission may be transmitted via a flooding procedure as an implicit route request. By transmitting actual data packets of a data transmission in lieu of route-request topology-learning packets, the multi-node communication network 100 may enable more efficient network topography learning, eliminate initial route discovery/topology learning delay, and reduce route failure rate. For example, routes discovered with "short" route-request packets or "Hello" messages may not be suitable and/or appropriate to route actual data packets of a data transmission, which may be substantially longer than the short route-request packets or "Hello" messages. Thus, the longer data packets may experience additional route failures on top of route failures attributable to network topology changes. In particular, by transmitting a data packets which are approximately equivalent in size to other data packets of the data transmission to be sent, embodiments of the present disclosure may ensure discovered paths are suitable and/or appropriate for subsequent data packets to be transmitted.

It is contemplated herein that various flooding concepts and protocols may be utilized in order to optimize the packet flooding procedures used throughout the present disclosure to improve performance and reliability. For example, smart frame error recovery (SFER) and passive packet cross check (PPCC) concepts may be implemented during the packet flooding procedure in step 202. SFER is described in further detail in U.S. patent application Ser. No. 16/367,483, filed Mar. 28, 2019, entitled DATA FRAME ERROR RECOVERY FOR MULTI-NODE SYSTEMS, which is incorporated herein by reference in the entirety.

It is further contemplated herein that characteristics of the packet flooding procedure may be adaptively modified/adjusted based on one or more characteristics of the multi-node communication network 100 and the concept of operations (CONOPS). For example, the controller 104 of the source communication node 102a may determine the maximum transmission unit (MTU) of the multi-node communication network 100 and the size of the data packet (e.g., Data Packet #1) transmitted in step 202 based on the quality and congestion of the multi-node communication network 100. For instance, the controller 104 of the source communication node 102a may be configured to fragment a data transmission in to one or more data payloads (e.g., data packets) such that each data packet is less than or equal to the MTU of the multi-node communication network 100.

In a step 204, the first data packet (Data Packet #1) is received by the destination communication node 102n, wherein the first data packet was transmitted along a discovered route 110 including one or more relay communication nodes 102. This may be further understood with reference to FIG. 3B.

Figure 3B:
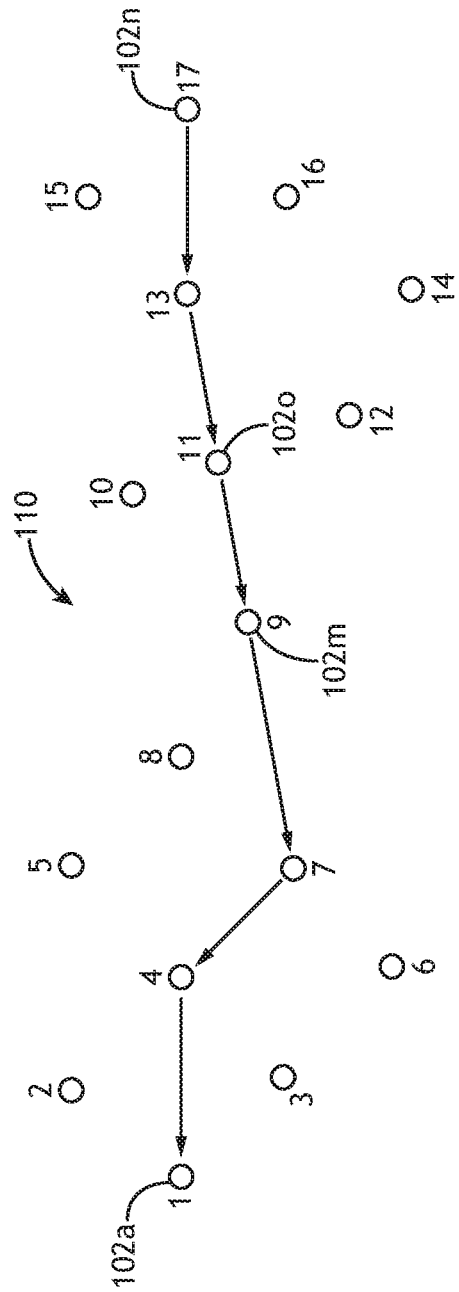
FIG. 3B illustrates a route response transmitted through a multi-node communication network along a discovered route, in accordance with one or more embodiments of the present disclosure.

FIG. 3B illustrates a route response transmitted through a multi-node communication network 100 along a discovered route 110, in accordance with one or more embodiments of the present disclosure. As shown in FIG. 3B, the destination communication node 102n may receive a copy of Data Packet #1 via a discovered route 110 including one or more relay communication nodes 102 of the multi-node communication network 100.

In a step 206, a route response is transmitted from the destination communication node 102n to the source communication node 102a along the discovered route 110.

For example, upon receiving a data packet transmitted from the source communication node 102a along a discovered route 110, the destination communication node 102n may identify the discovered route 110 and transmit a route response to the source communication node 102a along the discovered route 110. In particular, the destination and relay communication nodes 102n may be configured to store a routing table in memory 106 associated with a route taken by the received data packet, as determined by the data packet flooding process. The controller 104n of the destination communication node 102n may be further configured to time-stamp the stored routing table.

In this regard, the destination communication node 102n may transmit a route response to the source communication node 102a via one or more relay communication nodes 102 along the discovered route 110 via a point-to-point communication (e.g., non-flooding). Similarly, each relay communication node 102 along the discovered route 110 may be configured to receive the route response and relay (e.g., transmit) the route response along the discovered route 110 to the source communication node 102a. In embodiments, the controller 104n of the destination and relay communication nodes 102n may be configured to store a routing table associated with the identified discovered route 110 in memory 106n. Moreover, the route response may include information associated with a destination address of the destination communication node 102n as well as an address of the sender of the route response, which may be different from the destination communication node 102n, as will be described in further detail herein.

By transmitting reverse path notifications (e.g., route responses), one or more routes may be constructed between the source communication node 102a and the destination communication node 102n. Furthermore, the controller 104 of each communication node 102 may be configured to store a routing table associated with the discovered route 110. For the purposes of the present disclosure, the term "routing table" may be used to refer to a soft-state local list of neighboring nodes communicatively coupled to the respective communication node 102 "upstream" and "downstream" from the communication node 102 along the discovered route 110. Routing tables may be constructed and stored in memory of each communication node 102 based on unique identifiers and hop counts stored in the header of data packets/route request acknowledgements. Furthermore, each communication node 102 may be configured to update a routing table upon receipt of a data packet and/or route request acknowledgement, and time-stamp the updated routing table. In this regard, reception of data packets and/or route request acknowledgements within the multi-node communication network 100 may serve to cause communication nodes 102 to update routing tables between the source communication node 102a and the destination node 102n to ensure routes used remain fresh and viable. This will be discussed in further detail herein.

It is noted herein that the first copy of the data packet (e.g., Data Packet #1) transmitted via the packet flooding procedure may oftentimes be transmitted along the most direct route between the source communication node 102a and the destination communication node 102n. However, this may not always be the case. In this regard, the controller 104n of the destination communication node 102n may be configured to select a particular route as the discovered route 110 based on any number of characteristics of the received copies of Data Packet #1 including, but not limited to, transmission time, hop count, traffic/congestion along each route, and the like.

For example, the destination communication node 102n may identify a first discovered route 110a upon receipt of a first copy of Data Packet #1. The destination communication node 102n may then be configured to store a routing table associated with the first discovered route 110a in memory 106 and transmit a route response along the first discovered route 110a. Subsequently, the communication node 102n may receive another copy of the Data Packet #1 which was transmitted along a second discovered route 110b which is more direct than the first discovered route 110 (e.g., lower hop count). In this example, the destination communication node 102n may be configured to update the routing table (and time-stamp) stored in memory 106n in order to replace the first discovered route 110a with the second discovered route 110b, and transmit a route response along the second route 110b. Furthermore, the controller 104n of the destination communication node 102n may be configured to use subsequently received copies of the flooded data packet (e.g., Data Packet #1) to populate routes/routing tables to various relay communication nodes 102 for future reference and retrieval. In embodiments, each relay communication node 102 is configured to store a routing table associated with the discovered route 110 in memory 106.

Upon the establishment of a discovered route 110, subsequent data packets may be transmitted directly from the source communication node 102a to the destination communication node 102n along the discovered route 110. This may be further understood with reference to FIG. 3C.

Figure 3C:
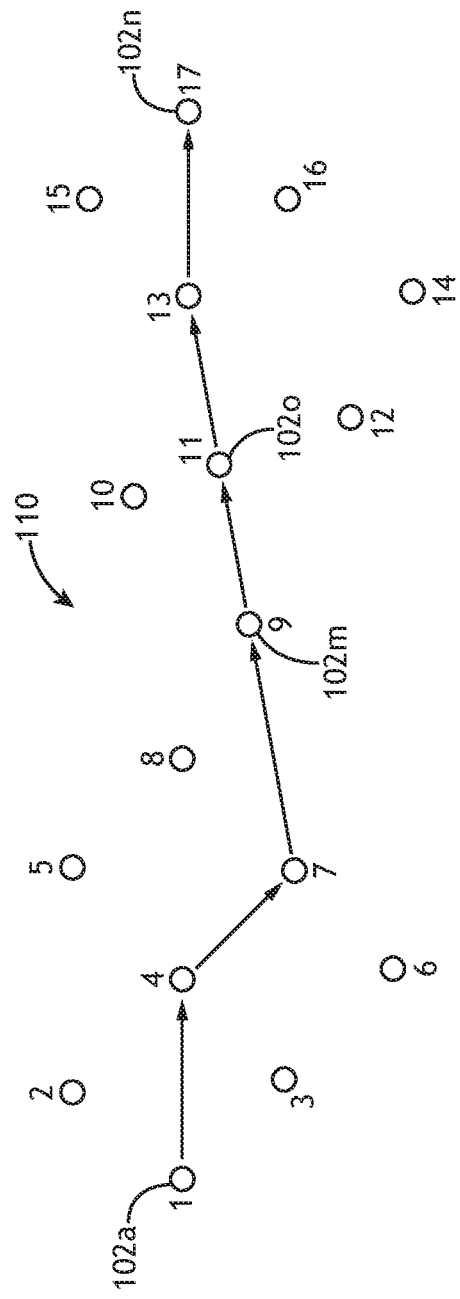
FIG. 3C illustrates a data packet transmitted through a multi-node communication network along a discovered route, in accordance with one or more embodiments of the present disclosure.

FIG. 3C illustrates a data packet transmitted through a multi-node communication network 100 along a discovered route 110, in accordance with one or more embodiments of the present disclosure.

In embodiments, upon receiving the route response (via communication interface 108) from the destination communication node 102n via discovered route 110, the controller 104a of the source communication node 102a may store a routing table associated with the discovered route 110 in memory 106, and time-stamp the stored routing table. Subsequently, the source communication node 102a may transmit one or more subsequent data packets to the destination communication node 102n via the communication interface 108a along the discovered route 110.

In embodiments, upon identifying and establishing a discovered route 110 via a packet flooding procedure and one or more route responses, the multi-node communication network 100 may be configured to transmit data packets of a larger data transmission via conventional point-to-point routing utilizing routing tables. In this regard, after flooding is used to establish the discovered route 110, the source communication node 102a may transmit subsequent data packets directly to the destination communication node 102n via a point-to-point routing transmission based on routing tables. Utilizing a flooding-to-routing communication protocol, as described herein, may reduce the amount of flooding required for data transmission, and may therefore reduce traffic throughout the system and enable improved spectrum utilization and efficiency.

In embodiments, each relay communication node 102 (e.g., relay communication node 102m) along the discovered route 110 may be configured to receive the subsequent data packets, via a communication interface 108, and relay (e.g., transmit) the received data packets along the discovered route 110 via a conventional routing procedure. Further, each relay communication node 102 may be configured to store a routing table associated with the discovered route 110 in memory 106, time-stamp stored routing tables, and update the stored routing tables upon reception and/or transmission of a data packet.

Upon receiving one or more route responses from the destination communication node 102n, the source communication node 102a may elect to transmit one or more data packets via a packet flooding procedure if the discovered route 110 exhibits a hop count which is excessive or undesirable. In this regard, the controller 104a of the source communication node 102a may be configured to identify a hop count of the discovered route 110 (via the header), and determine whether to transmit subsequent packets via a packet flooding procedure based on the identified hop count. This may be done in order to identify additional discovered routes 110 which may exhibit shorter and more desirable hop counts.

In a step 208, a first additional data packet (Data Packer #M) is transmitted from the source communication node 102a to the destination communication node 102n along the discovered route 110. In a step 210, a route failure of the transmitted first additional data packet (Data Packer #M) is determined with a relay communication node 102m of the one or more relay communication nodes 102 along the discovered route 110. This may be further understood with reference to FIG. 3D.

Figure 3D:
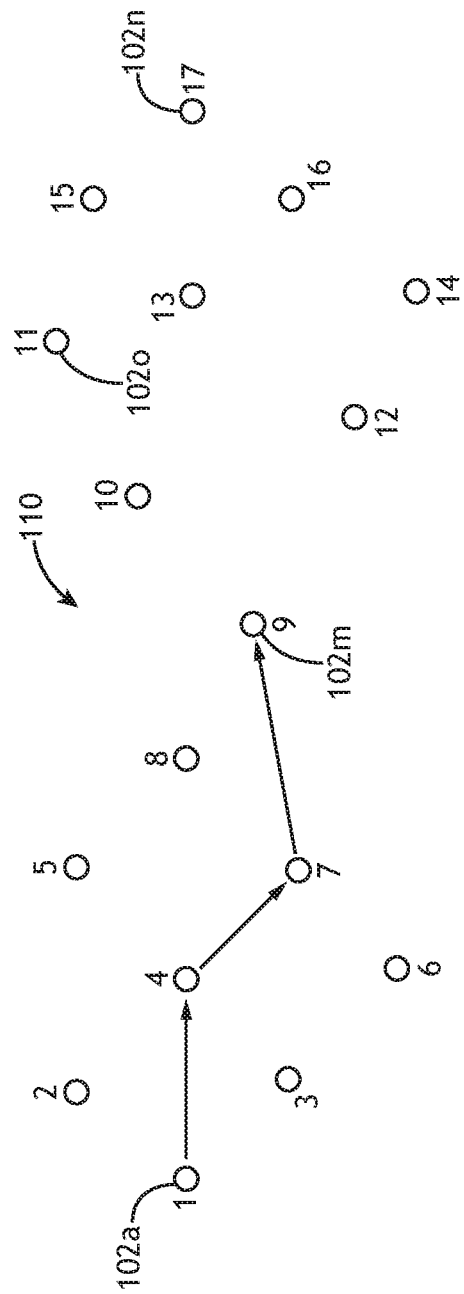
FIG. 3D illustrates a route failure of a data packet transmitted through a multi-node communication network, in accordance with one or more embodiments of the present disclosure.

FIG. 3D illustrates a route failure of a data packet (Data Packet #M) transmitted through a multi-node communication network 100, in accordance with one or more embodiments of the present disclosure.

As shown in FIG. 3D, a first additional data packet (e.g., Data Packet #M) may be transmitted via conventional point-to-point routing from the source communication node 102a to the destination communication node 102n. While en route, a relay communication node 102m (e.g., Communication Node 9) may determine a route failure of the Data Packet #M, in that Data Packet #M was not successfully delivered to the next communication node 102 (e.g., Communication Node 11) along the discovered route 110.

Figure 3E:
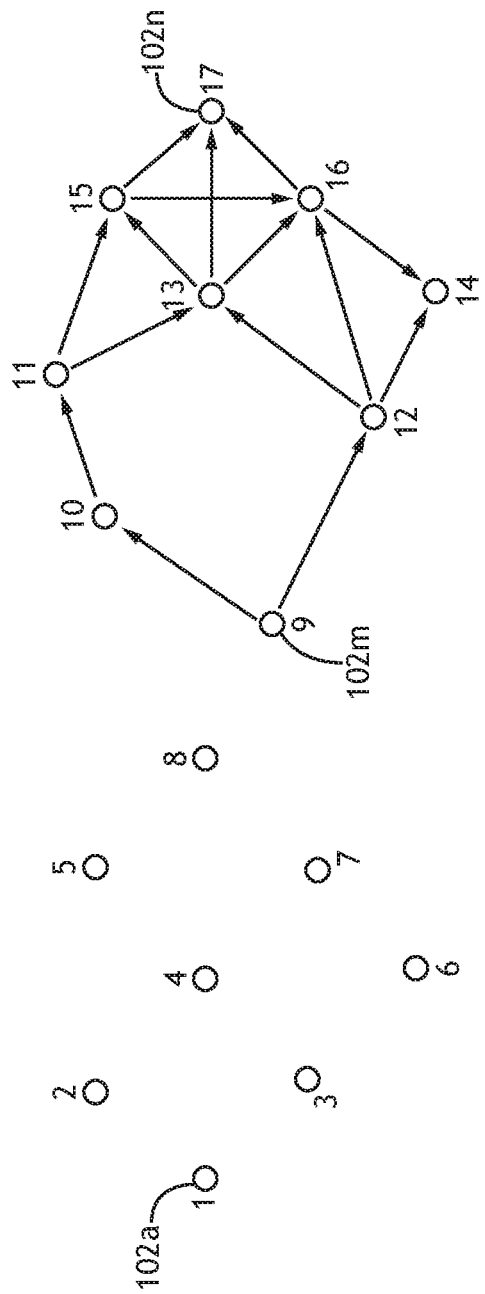
FIG. 3E illustrates a data packet transmitted through a multi-node communication network via a packet flooding procedure, in accordance with one or more embodiments of the present disclosure.

It is noted herein that a route failure may be attributable to any number of factors. For example, a route failure may be attributable to weather conditions, terrestrial obstructions, channel congestion, and the like. By way of another example, a route failure may be attributable to communication nodes 102 moving out of range from one another. For instance, as shown in FIGS. 3D-3E, a routing failure may be attributable to relay communication node 102o moving out of range from the relay communication node 102m.

Communication nodes 102 (e.g., relay communication node 102m) within the multi-node communication network 100 may be configured to identify/determine route failures using any technique known in the art. For example, in some embodiments, receiving communication nodes 102 may be configured to transmit acknowledgement messages (e.g., ACKs) to associated transmitting communication nodes 102 upon reception of a data packet. In this regard, acknowledgement messages may indicate successful transmission of a data packet, while the absence of acknowledgement messages may function as negative-acknowledgement messages (e.g., NAKs) and indicate a route failure.

For instance, as shown in FIG. 3D, the relay communication node 102m may transmit Data Packet #M to relay communication node 102o along the discovered route 110 at a first time. The controller 104m of the relay communication node 102m may be configured to store a transmittal time (e.g., first time) of the Data Packet #M in memory 106m. Continuing with the same example, the controller 104m of the relay communication node 102m may subsequently identify the absence of an acknowledgement message from the relay communication node 102o at a second time, and store the second time in memory. In this example, the controller 104m may be configured to identify a route failure if a time difference between the second time and the first time exceeds a routing timeout threshold. In this regard, communication nodes 102 within the multi-node communication network 100 may be configured to determine a route failure if an acknowledgement message is not received in a pre-determined amount of time (e.g., routing timeout threshold) after transmitting a data packet.

In additional and/or alternative embodiments, communication nodes 102 within the multi-node communication network 100 may be configured to determine a route failure based on signals and/or data within a lower layer of the multi-node communication network 100. In this regard, the controller 104 of a communication node 102 may be configured to predict a breakage of a lower layer, and therefore a routing failure, without having to identify the absence of an acknowledgement message (e.g., implicit NAK). By way of another example, a controller 104 may be configured to determine a route failure based on data within the physical layer indicative of boundary conditions of the communication.

In embodiments, after identifying a route failure, a controller 104 of communication nodes 102 may be configured to remove the routing entry associated with the route failure from the routing table of the discovered route 110 stored in memory 106. For example, upon identifying the route failure, the controller 104m of the relay communication node 102m may be configured to remove the routing entry associated with relay communication node 102o and the route failure from the routing table of the discovered route 110 stored in memory 106m.

In a step 212, the additional data packet is re-transmitted to one or more communication nodes of the multi-node communication network via a packet flooding procedure with the relay communication node of the one or more relay communication nodes. This may be further understood with reference to FIG. 3E.

FIG. 3E illustrates a data packet (Data Packet #M) transmitted through a multi-node communication network 100 via a packet flooding procedure, in accordance with one or more embodiments of the present disclosure.

In embodiments, a data packet (e.g., Data Packet #M) which was not successfully transmitted due to a route failure may be re-transmitted to one or more communication nodes 102 via a packet flooding procedure. It is contemplated herein that transmitting the Data Packet #M via a packet flooding procedure may be carried out in order to recover a route to the destination communication node 102n. It is further contemplated herein that recovering a route to the destination communication node 102n at the location of the route failure, instead of from the source communication node 102a, may expedite the route recovery time, and preserve portions of routes (e.g., discovered route 110) which are still fresh and viable.

For example, as shown in FIG. 3E, the relay communication node 102m may re-transmit Data Packet #M via a packet flooding procedure after identifying the route failure in the step 210. Before transmitting Data Packet #M, the communication node 102m may store a destination address (e.g., broadcasting/anycasting address) of the destination communication node 102n in the header of the flooded data packet. It is noted herein that characteristics of the packet flooding procedure shown and described with reference to step 202 may be regarded as applying to the packet flooding procedure in step 212, unless noted otherwise herein. In this regard, the packet flooding procedure utilized in step 212 may include any packet flooding procedure known in the art including, but not limited to, EFPC, ZOEF, and the like.

In a step 214, an additional route response is transmitted from the destination communication node 102n to the source communication node 102a along a recovered route 112 with the relay communication node 102m of the one or more relay communication nodes 102. This may be further understood with reference to FIG. 3F.

Figure 3F:
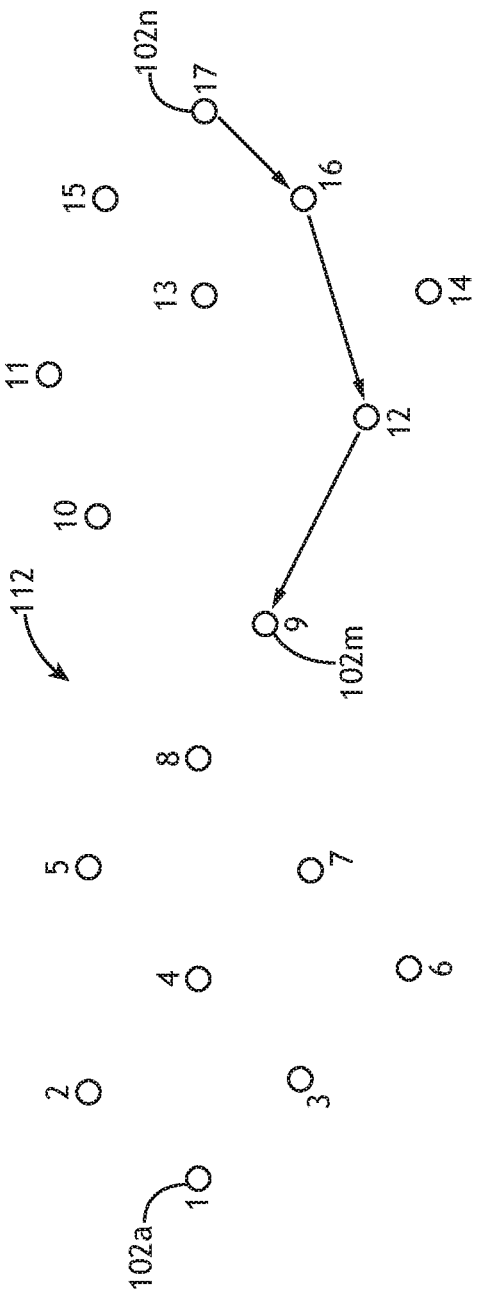
FIG. 3F illustrates a route response transmitted through a multi-node communication network along a recovered route, in accordance with one or more embodiments of the present disclosure.

FIG. 3F illustrates a route response transmitted through a multi-node communication network 100 along a recovered route, in accordance with one or more embodiments of the present disclosure.

As shown in FIG. 3F, the destination communication node 102n may receive a copy of Data Packet #M via a recovered route 112 including one or more relay communication nodes 102 of the multi-node communication network 100. The recovered route 112 may be different from the discovered route 110 in that the recovered route 112 may include one or more additional, fewer, and/or alternative relay communication nodes 102 as compared to the discovered route 110.

In embodiments, the destination communication node 102n may receive a number of copies of the Data Packet #M transmitted via a packet flooding procedure. It is noted herein that the first copy of the data packet (e.g., Data Packet #M) transmitted via the packet flooding procedure may oftentimes be transmitted along the most direct route between the relay communication node 102m and the destination communication node 102n. However, this may not always be the case. In this regard, the controller 104n of the destination communication node 102n may be configured to select a particular route as the recovered route 112 based on any number of characteristics of the received copies of Data Packet #M including, but not limited to, transmission time, hop count, traffic/congestion along each route, and the like. Upon receiving one or more copies of the Data Packet #M, the controller 104n of the destination communication node 102n may be configured to replace the routing table associated with the discovered route 110 stored in memory 106 with a routing table associated with the recovered route 112, and update a time-stamp associated with the updated routing table.

In embodiments, each relay communication node 102 along the recovered route 112 between the destination communication node 102n and the relay communication node 102m may be configured to receive the route response and relay the route response along the recovered route 112 to the relay communication node 102m, as shown in FIG. 3F. Additionally, the relay communication node 102m and each relay communication node 102 may be configured to replace the routing table associated with the discovered route 110 a routing table associated with the recovered route 112, and time-stamp the updated routing table.

In a step 216, a second additional data packet (Data Packet #N) transmitted from the source communication node 102a to the destination communication node 102n is relayed along the recovered route 112 with the relay communication node 102m. This may be further understood with reference to FIG. 3G.

Figure 3G:
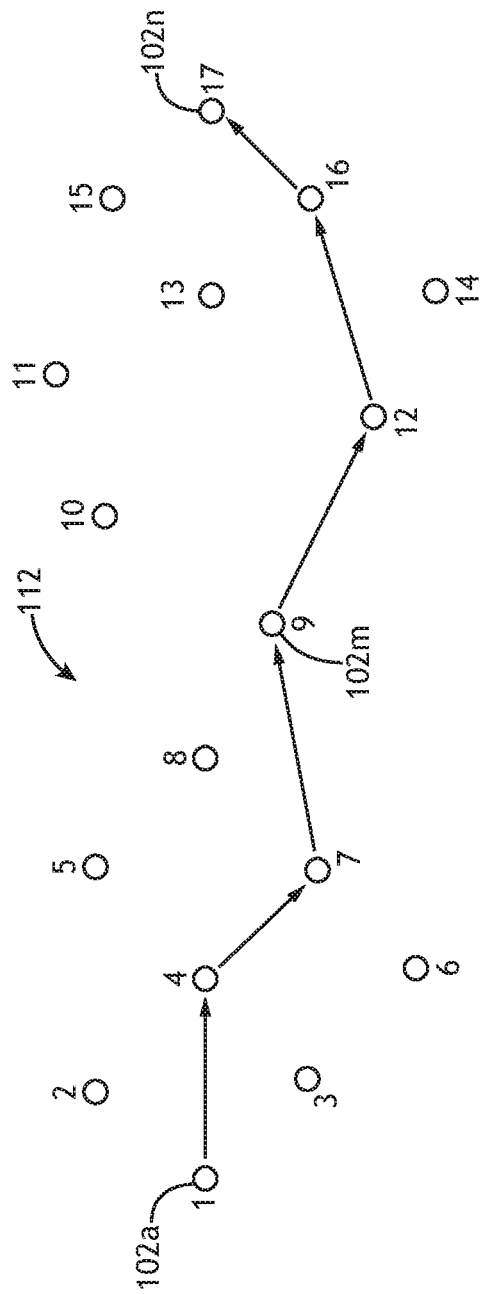
FIG. 3G illustrates a data packet transmitted through a multi-node communication network along a recovered route, in accordance with one or more embodiments of the present disclosure.

FIG. 3G illustrates a data packet (Data Packet #N) transmitted through a multi-node communication network 100 along a recovered route 112, in accordance with one or more embodiments of the present disclosure.

In embodiments, upon identifying and establishing a recovered route 112 (and updating routing tables to correspond to the recovered route 112), subsequent data packets may be transmitted via conventional point-to-point routing utilizing the routing table from the source communication node 102a to the destination communication node 102n along the recovered route 112. For example, a second additional data packet (Data Packet #N) may be transmitted from the source communication node 102a to the destination communication node 102n along the recovered route 112 via point-to-point routing based on the stored routing table associated with the recovered route 112.

Figure 4:
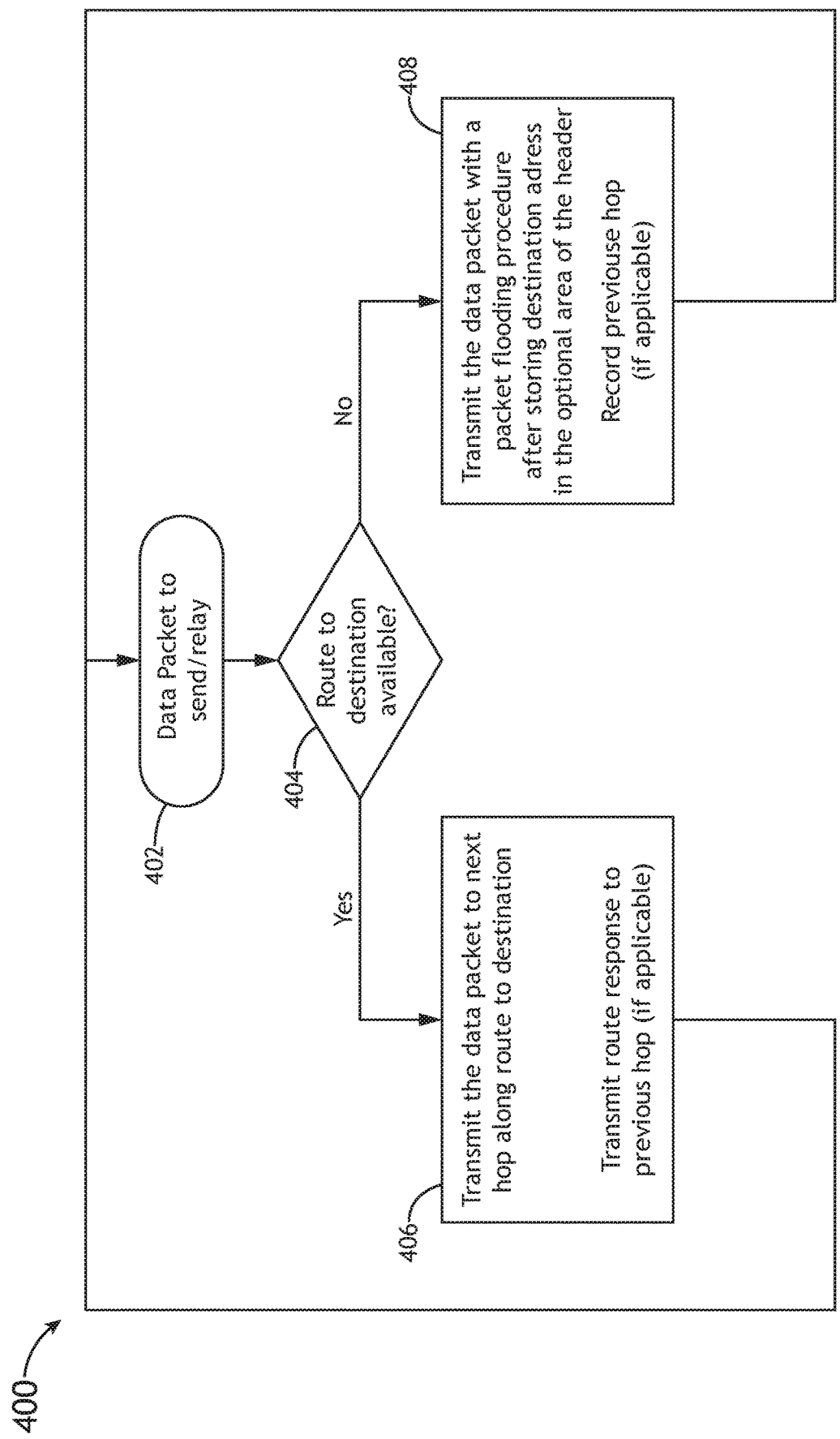
FIG. 4 illustrates a flowchart of a method for transmitting data within a multi-node communication network, in accordance with one or more embodiments of the present disclosure.

FIG. 4 illustrates a flowchart of a method 400 for transmitting data within a multi-node communication network 100, in accordance with one or more embodiments of the present disclosure. It is noted herein that the steps of method 400 may be implemented all or in part by multi-node communication network 100 and/or method 200. It is further recognized, however, that the method 400 is not limited to the multi-node communication network 100 and/or method 200 in that additional or alternative system-level embodiments may carry out all or part of the steps of method 400.

In a step 402, a communication node 102 of a multi-node communication network 100 identifies a data packet which is to be transmitted and/or relayed. For example, as shown in FIGS. 3A-3G, a relay communication node 102m may receive a data packet transmitted from the source communication node 102a. The relay communication node 102m may identify the data packet as being needed to be relayed to the destination communication node 102*n* via a destination address in a header of the data packet.

In a step 404, the communication node 102 determines whether there is an available route to the destination communication node 102*n*. For example, the controller 104*m* of the relay communication node 102*m* may determine whether there is a routing table stored in memory 106*m* associated with a discovered route 110 to the destination communication node 102*n*.

If there is an available route to the destination communication node 102*n* (Step 404="Yes"), method 400 may proceed to a step 406 and a step 408. In a step 406, the communication node 102 transmits the data packet to the next hop along the route to the destination. The communication node 102 may further transmit a route response to the previous hop (e.g., previous communication node 102), if applicable. For example, as shown in FIG. 3C, the relay communication node 102*m* may transmit the data packet to the relay communication node 102*o* along the discovered route 110 from the source communication node 102*a* to the destination communication node 102*n*.

If there is no available and/or fresh route to the destination communication node 102*n* in step 404 (Step 404="No"), method 400 may proceed to a step 408. In a step 408, the communication node 102 transmits the data packet to one or more communication nodes 102 of the multi-node communication network 100 via a packet flooding procedure after storing the destination address of the destination communication node 102*n* in the header of the data packet. In addition to transmitting the data packet via a packet flooding procedure, the communication node 102 may further be configured to record the previous hop (e.g., previous communication node 102) by updating a routing table to the source communication node 102*a* in memory 106 and add a unique identifier associated with the communication node 102 in the header of the data packet in order to implement flooding with bookkeeping. For example, as shown in FIG. 3D, the relay communication node 102*m* may transmit the data packet to one or more communication nodes 102 via a packet flooding procedure in order to recover a route from the relay communication node 102*m* to the destination communication node 102*n*. The one or more communication nodes 102 may further be configured to relay the received data packet via a packet flooding procedure to the destination communication node 102*n*.

Figure 5:
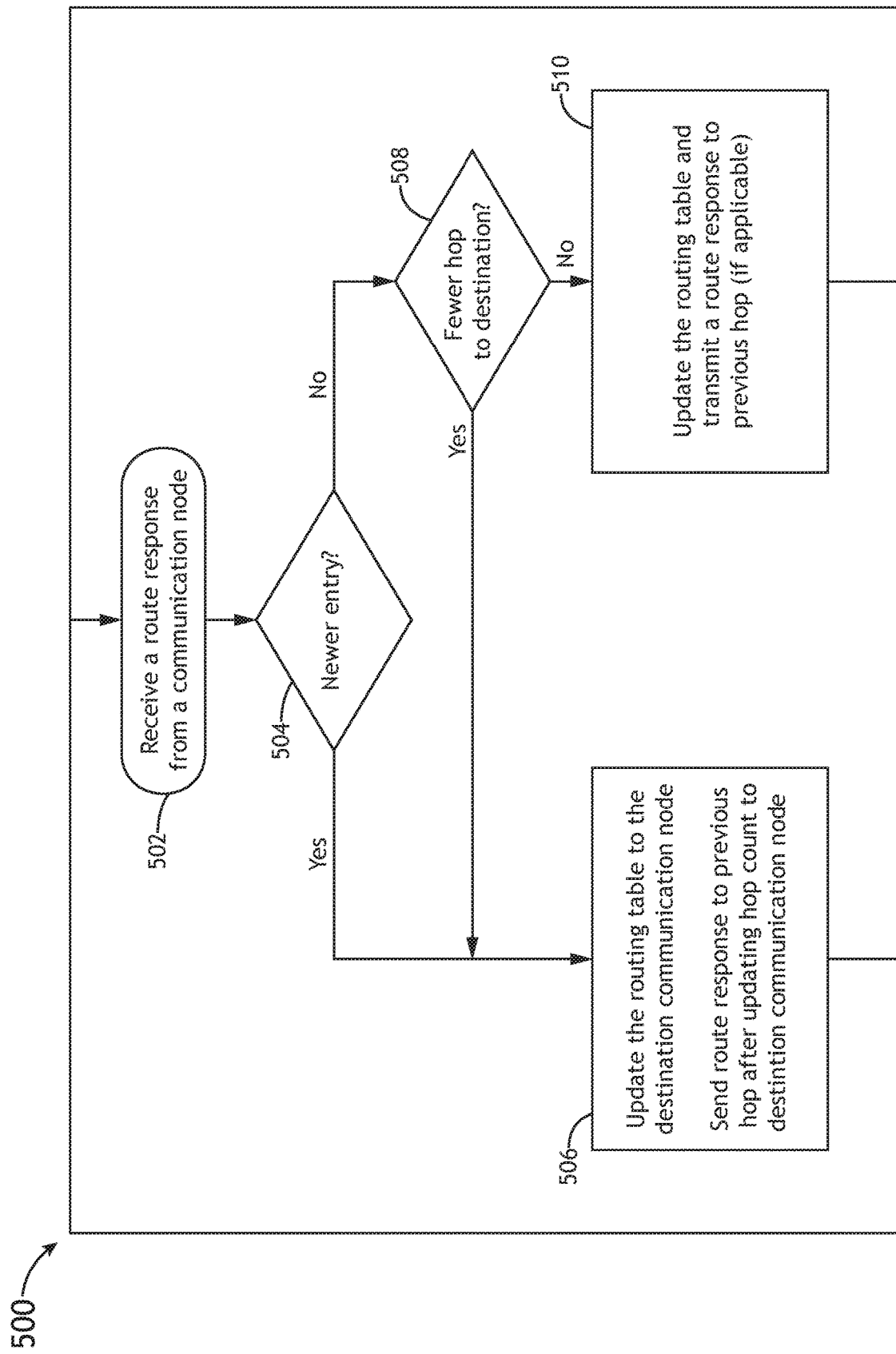
FIG. 5 illustrates a flowchart of a method for transmitting data within a multi-node communication network, in accordance with one or more embodiments of the present disclosure.

FIG. 5 illustrates a flowchart of a method 500 for transmitting data within a multi-node communication network 100, in accordance with one or more embodiments of the present disclosure. It is noted herein that the steps of method 500 may be implemented all or in part by multi-node communication network 100 and/or method 200. It is further recognized, however, that the method 500 is not limited to the multi-node communication network 100 and/or method 200 in that additional or alternative system-level embodiments may carry out all or part of the steps of method 500.

In particular, method 500 may illustrate a method carried out by communication nodes 102 of a multi-node communication network 100 to update routing tables and discovered/recovered routes when a route response is received.

In a step 502, a communication node 102 receives a route response from another communication node 102. For example, after a data packet is transmitted throughout the multi-node communication network 100 from the source communication node 102*a* to the destination communication node 102*n*, the destination communication node 102*n* may transmit a route response along a discovered route 110 and/or recovered route 112 back to the source communication node 102*n*. For instance, as shown in FIG. 3B, the relay communication node 102*m* may receive a route response from the relay communication node 102*o*.

In a step 504, the controller 104 of the communication node 102 determines whether the route response was received from a newer entry (e.g., new communication node 102). For example, if the relay communication node 102*m* had not previously received a route response from the relay communication node 102*o*, the controller 104*m* of the relay communication node 102*m* may be configured to determine that the relay communication node 102*o* is a new entry.

If the controller 104 of the communication node 102 determines it is a new entry (e.g., new communication node 102 which transmitted the route response) in step 504, method 500 proceeds to a step 506. In a step 506, upon determining the route response was received from a new entry (e.g., new communication node 102), the controller of the communication node 102 updates the routing table to the destination communication node 102*n* stored in memory 106 based on the hop count and unique identifiers within the header of the route response. In this regard, the communication node 102 may update the routing table to reflect the new route from the source communication node 102*a* to the destination communication node 102*n*. The controller 104 may be further configured to update hop count of and update a time-stamp associated with the updated routing table. The controller 104 may then be further configured to transmit the route response, via communication interface 108, to the next upstream hop along the route to the source communication node 102*a* after updating the hop count to the destination communication node 102*n*. For example, the relay communication node 102*m* may transmit the route response to the Communication Node 7 (e.g., upstream hop) toward the source communication node 102*a*.

If the controller 104 of the communication node 102 determines it is not a new entry (e.g., new communication node 102 which transmitted the route response) in step 504 (Step 504="No"), method 500 proceeds to a step 508.

In a step 508, the controller 104 determines whether the route associated with the received route response is shorter than the route associated with the routing table stored in memory 106. For example, the relay communication node 102*m* may have previously received route responses from the relay communication node 102*o* (e.g., Step 504="No"). However, a subsequent route response received from the relay communication node 102*o* may indicate a shorter hop count between the relay communication node 102*o* and the destination communication node 102*n*, and therefore a shorter route between the source communication node 102*a* and the destination communication node 102*n* (e.g., Step 510="Yes"). In this example, the controller 104 may be configured to identify a shorter hop count to the destination communication node 102*n* (Step 508="Yes"), in which case method 500 may proceed to step 506, as described previously herein.

If the controller 104 of the communication node 102 determines that the received route response does not represent a route with a lower hop count to the destination communication node 102*n* (e.g., Step 508="No"), method 500 may proceed to a step 510.

In a step 510, the controller 104 updates the routing table and a time stamp associated with the routing table stored in memory 106. The controller 104 may then be configured to transmit/relay the route response to the next upstream hop, if applicable. For example, the relay communication node 102*m* may transmit the route response to the Communication Node 7 (e.g., upstream hop) toward the source communication node 102*a*.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A communication node of a multi-node communication network, the communication node comprising:
a communication interface; and
a controller communicatively coupled to the communication interface, the controller configured to:
receive a first data packet, via the communication interface, transmitted from a source communication node to a destination communication node;
transmit the first data packet, via the communication interface, to one or more relay communication nodes via a packet flooding procedure;
receive a first route response, via the communication interface, transmitted from the destination communication node to the source communication node along a discovered route;
relay a first additional data packet transmitted from the source communication node to the destination communication node along the discovered route;
determine a route failure of the first additional data packet;
re-transmit, via the communication interface, the first additional data packet to the destination communication node via a packet flooding procedure;
receive an additional route response, via the communication interface, transmitted from the destination communication node to the source communication node along a recovered route; and
relay a second additional data packet transmitted from the source communication node to the destination communication node along the recovered route.

2. The communication node of claim 1, wherein determining a route failure of the first additional data packet comprises:
transmitting the first additional data packet, via the communication interface, to the destination communication node along the discovered route at a first time;
determining an absence of an acknowledgment message at a second time subsequent to the first time; and
determining a time difference between the second time and the first time exceeds a routing timeout threshold.

3. The communication node of claim 1, wherein determining a route failure of the first additional data packet comprises:
determining a route failure based on data within a lower layer of the multi-node communication network.

4. The communication node of claim 1, wherein receiving the first route response transmitted from the destination communication node to the source communication node along the discovered route further comprises:
storing a routing table in memory associated with the discovered route.

5. The communication node of claim 1, further including a memory configured to store a local list of one or more communication nodes communicatively coupled to the communication node.

6. The communication node of claim 5, wherein the controller is further configured to:
store the discovered route in memory.

7. The communication node of claim 1, wherein at least one of the first data packet or the second data packet comprise a data packet of a data transmission between the source communication node and the destination communication node.

8. The communication node of claim 1, wherein transmitting the second additional data packet to the destination communication node along the recovered route comprises:
transmitting the second additional data packet to the destination communication node along the recovered route via point-to-point routing utilizing a routing table.

9. The communication node of claim 1, wherein:
the discovered route includes a first set of one or more relay communication nodes between the source communication node and the destination communication node,
the recovered route includes a second set of one or more relay communication nodes between the source communication node and the destination communication node, and
the second set of one or more communication nodes is different from the first set of one or more communication nodes.

10. The communication node of claim 1, wherein the first data packet received by the communication node includes a flooding indicator indicating the first data packet was transmitted via a packet flooding procedure.

11. The communication node of claim 1, wherein relaying an additional data packet transmitted from the source communication node to the destination communication node along the discovered route comprises:
receiving the additional data packet, via the communication interface, transmitted from the source communication node to the destination communication node along the discovered route; and
transmitting the additional data packet, via the communication interface, to the destination communication node via along the discovered route.

12. A method for transmitting data within a multi-node communication network, comprising:
transmitting a first data packet from a source communication node of a multi-node communication network to a destination communication node via a flooding transmission procedure;
receiving the first data packet transmitted along a discovered route including one or more relay communication nodes with the destination communication node;

transmitting a route response from the destination communication node to the source communication node along the discovered route;
transmitting a first additional data packet from the source communication node to the destination communication node along the discovered route;
determining, with a relay communication node of the one or more relay communication nodes along the discovered route, a route failure of the first additional data packet;
re-transmitting, with the relay communication node of the one or more relay communication nodes, the first additional data packet to the destination communication node via a packet flooding procedure;
receiving an additional route response acknowledgment transmitted from the destination communication node to the source communication node along a recovered route; and
relaying a second additional data packet from the source communication node to the destination communication node along the recovered route with the relay communication node of the one or more relay communication nodes.

13. The method of claim 12, wherein determining, with the relay communication node of the one or more relay communication nodes along the discovered route, the route failure of the transmitted additional data packet, comprises:
transmitting, with the relay communication node of the one or more relay communication nodes along the discovered route, the additional data packet to the destination communication node along the discovered route at a first time;
determining an absence of an acknowledgment at a second time subsequent to the first time; and
determining a difference between the second time and the first time exceeds a routing timeout threshold.

14. The method of claim 12, wherein transmitting the additional data packet from the source communication node to the destination communication node along the recovered route comprises:
receiving the additional data packet, via the communication interface, transmitted from the source communication node to the destination communication node along the discovered route; and
transmitting the additional data packet, via the communication interface, to the destination communication node via along the discovered route.

15. The method of claim 12, transmitting a first additional data packet from the source communication node to the destination communication node along the discovered route comprises:
transmitting the first additional data packet from the source communication node to the destination communication node via point-to-point routing utilizing a routing table.

* * * * *